(12) United States Patent
Vaughan

(10) Patent No.: US 8,185,460 B1
(45) Date of Patent: May 22, 2012

(54) ELECTRONIC FINANCIAL TRANSLATION SYSTEM ARCHITECTURE

(75) Inventor: Ty C. Vaughan, Sammamish, WA (US)

(73) Assignee: Bank of America Corporation, Charlotte, NC (US)

( * ) Notice: Subject to any disclaimer, the term of this patent is extended or adjusted under 35 U.S.C. 154(b) by 353 days.

(21) Appl. No.: 12/271,542

(22) Filed: Nov. 14, 2008

Related U.S. Application Data

(60) Provisional application No. 61/079,034, filed on Jul. 8, 2008.

(51) Int. Cl.
 *G06Q 40/00* (2012.01)
(52) U.S. Cl. .......................................... 705/35; 705/42
(58) Field of Classification Search ...................... 705/35
 See application file for complete search history.

(56) References Cited

U.S. PATENT DOCUMENTS

| | | | |
|---|---|---|---|
| 6,782,003 B1 | 8/2004 | Giroux et al. | |
| 6,856,970 B1 * | 2/2005 | Campbell et al. | 705/35 |
| 2002/0120787 A1 | 8/2002 | Shapiro et al. | |
| 2005/0171811 A1 | 8/2005 | Campbell et al. | |

OTHER PUBLICATIONS

Rich Seeley, "Patagon Saves Old Components for New App", obtained from: www.adtmag.com, Apr. 15, 2002, 5 pgs., Copyright 2006 101 communications LLC, Ambler, PA.

* cited by examiner

*Primary Examiner* — Samica L Norman
(74) *Attorney, Agent, or Firm* — Banner & Witcoff, Ltd.; Michael A. Springs

(57) ABSTRACT

Aspects of the invention include methods and systems for an electronic financial transaction system with a translation system architecture. Aspects of the invention provide translation methods such that the front-end functions (e.g., authentication, presentation, content library, data library, and banking functions) are all performed under one system. These front-end functions are decoupled from their respective bank back office systems. The information from these front-end functions are merged together to form a session profile information. The translation service or module receives this session profile information and translates the session profile information of the transactions in order to complete the transaction for the user.

20 Claims, 4 Drawing Sheets

ELECTRONIC FINANCIAL TRANSLATION SYSTEM ARCHITECTURE

This application claims the benefit of U.S. Provisional Application No. 61/079,034, filed Jul. 8, 2008, the disclosure of which is herein incorporated by reference in its entirety.

FIELD OF THE INVENTION

The present invention relates to a system and method for electronic financial transactions, and more particularly to an electronic financial translation system architecture for the translation of financial or banking transactions.

BACKGROUND

Electronic banking is growing tremendously for banks and for users. For many users, electronic banking may be an alternate, or even primary, means to perform their banking transactions. With this growth, the banking system architecture required to perform the electronic banking functions has also grown tremendously. Generally, the banking system architecture has been a complex system in which each bank back office within the banking system has its own method, process, or system to perform the transactions.

A bank back office may include one or more regional banking systems, one or more newly acquired banking systems, or one or more Automated Teller Machines (ATMs). Within each method or process for online transactions, the transaction may be processed through a session management area, an online presentation layer, and a functional layer before the transaction is processed at the user's bank. For example, when a user submits a transaction, such as a transfer of money from account A to account B, the transaction is immediately directed to one of the various bank back offices, and the individual bank back office processes the entire transaction through until the final state. In the current architecture, each of these layers is coupled together for each banking application.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to methods and systems for providing a financial transaction system with an ecommerce translation system architecture that that will improve functionality, interoperability, and processing times for the operation of an ecommerce banking system and the back office banking systems.

In one embodiment in accordance with aspects of the invention, a method is disclosed to streamline online banking. Such a method may decouple the user from their bank back office system. A user initiates a banking session and provides a unique identifier and authentication, which creates a session profile. This session profile information is then merged with a banking profile and an online profile. Also, the session profile information is populated into a session cache. The user initiates an action as governed by a session profile filter from the session cache as presented by a session presentation service. Next, the action is initiated against a user accessible account governed by parameters from the session cache. A generic financial transaction is then sent to a translation service with parameters from the session cache. Also, the translation service selects the translation based on the session cache parameters, and assembles one or more financial transactions. Next, the translation service submits one or more financial transactions and receives and aggregates one or more transaction responses from a bank system. The translation service then provides an aggregate transaction response to the session presentation service. Also, the session presentation service provides the transaction response to the user. Although steps of the illustrative method have been depicted in a particular order in the aforementioned example, the disclosure contemplates the steps being performed in one or more different orders and/or one or more steps being optional/combined.

In another embodiment, a system comprising a processor configured to execute computer-executable instructions stored in a tangible computer-readable medium. The tangible computer-readable medium stores the computer-executable instructions causing the processor to perform a method to decouple the user from their bank back office system. A user initiates a banking session and provides a unique identifier and authentication, which creates a session profile. This session profile information is then merged with a banking profile and an online profile. Also, the session profile information is populated into a session cache. The user initiates an action as governed by a session profile filter from the session cache as presented by a session presentation service. Next, the action is initiated against a user accessible account governed by parameters from the session cache. A generic financial transaction is then sent to a translation service with parameters from the session cache. Also, the translation service selects the translation based on the session cache parameters, and assembles one or more financial transactions. Next, the translation service submits one or more financial transactions and receives and aggregates one or more transaction responses from a bank system. The translation service then provides an aggregate transaction response to the session presentation service. Also, the session presentation service provides the transaction response to the user. Although steps of the illustrative method have been depicted in a particular order in the aforementioned example, the disclosure contemplates the steps being performed in one or more different orders and/or one or more steps being optional/combined.

An additional embodiment is a financial transaction system comprising a number of different program modules: a session management module, a presentation module, a function module, a banking system module, and a translation module. The session management module is operable to receive a unique identifier, authenticate the unique identifier, create a session profile from the unique identifier, merge the session profile with a banking profile and an online profile, populate the session profile into a session cache, and transmit the session cache to the presentation module. The presentation module is operable to receive to the session cache from the session management module, receive a user requested function, and transmit the session profile from the session cache and the user requested function. The function module is operable to initiate the user requested function against the session profile, and transmit the user requested function to the translation module based on the session profile from the session cache. The translation module is operable to translate the user requested function into a financial transaction and submit the financial transaction to the banking system module. The banking system module is operable to receive the financial transaction, generate a transaction response to the financial transaction, and transmit the transaction response to the translation module. The translation module is further operable to receive the transaction response from the banking system module, and provide the transaction response to the presentation module. The presentation module is further operable to provide the transaction response to the user.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Illustrative Operating Environment

Figure 1:
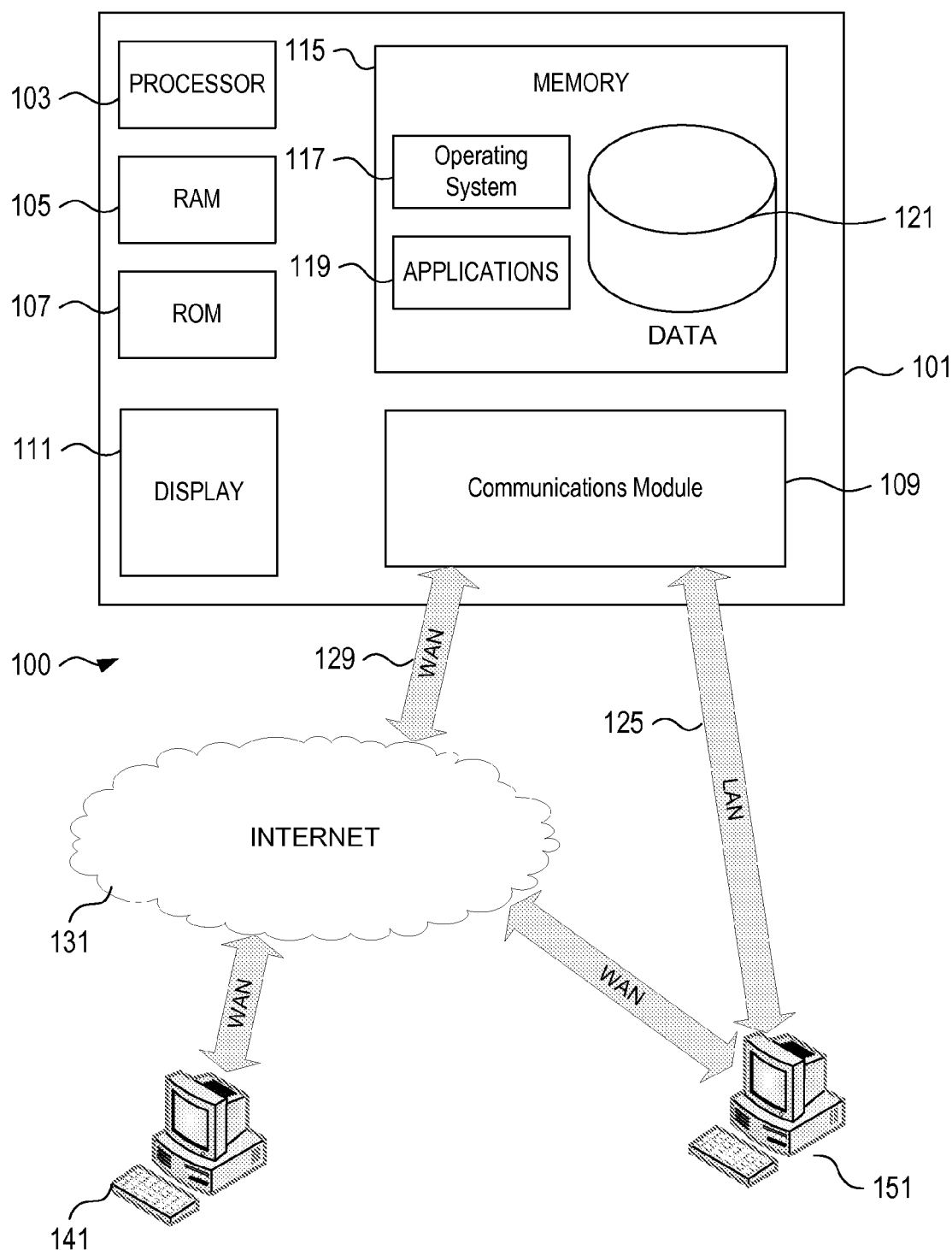
FIG. 1 depicts an illustrative operating environment for one or more aspects of the present invention.

FIG. 1 illustrates an example of a suitable computing system environment 100 that may be used according to one or more illustrative embodiments of the invention. The computing system environment 100 is only one example of a suitable computing environment and is not intended to suggest any limitation as to the scope of use or functionality of the invention. The computing system environment 100 should not be interpreted as having any dependency or requirement relating to any one or combination of components illustrated in the computing system environment 100.

Aspects of the invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, automated teller machines (ATMs), distributed computing environments that include any of the above systems or devices, and the like.

Aspects of the invention may be described in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computing device 101 having a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101. Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device 111 for providing textual, audio-visual and/or graphical output. Software may be stored within memory 115 and/or storage to provide instructions to processor 103 for enabling computing device 101 to perform various functions. For example, memory 115 may store software used by the computing device 101, such as an operating system 117, application programs 119, and a data store 121. Alternatively, some or all of the computer executable instructions for computing device 101 may be embodied in hardware or firmware (not shown). As described in detail below, the data store 121 may provide centralized storage of account information and account holder information for the entire business, allowing interoperability between different elements of the business residing at different physical locations. In some embodiments, the data store 121 may be physically located external to memory 115. For example, the data store 121 may be an enterprise database located at computing device 151.

Computing device 101 may operate in a networked environment supporting connections to one or more remote computing devices, such as branch or user devices 141 and 151. The branch or user computing devices 141 and 151 may be personal computing devices or servers that include many or all of the elements described above relative to the computing device 101. The network connections depicted in FIG. 1 include a local area network (LAN) 125 and a wide area network (WAN) 129, but may also include other networks. When used in a LAN networking environment, computing device 101 is connected to the LAN 125 through a network interface or adapter in the communications module 109. When used in a WAN networking environment, the server 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computing device 101 according to an illustrative embodiment of the invention may include computer executable instructions for invoking user functionality related to communication, such as email, short message service (SMS), and voice input and speech recognition applications.

Process for Electronic Financial Translation

A process for electronic financial translation may be used for the conversion of a received command to the appropriate command type required for the system of record based on a customer's user profile, system profile, bank profile, and/or available functions. Specifically, the system architecture of this electronic financial translation method is such that the front-end functions (e.g., authentication, presentation layer, content library, data library, and banking functions) are all performed under one system. These front-end functions are decoupled from their respective bank back office systems, whereas in the prior art, these front-end functions were coupled together with each of their respective bank back office systems. The information from these front-end functions are all merged together to form session profile information. A translation service receives this session profile information, which translates the session profile information of the transactions into a format in which the back bank office can utilize. The translation service then provides this translated session information to the respective bank back office in order to complete the transaction for the user.

Figure 2A:
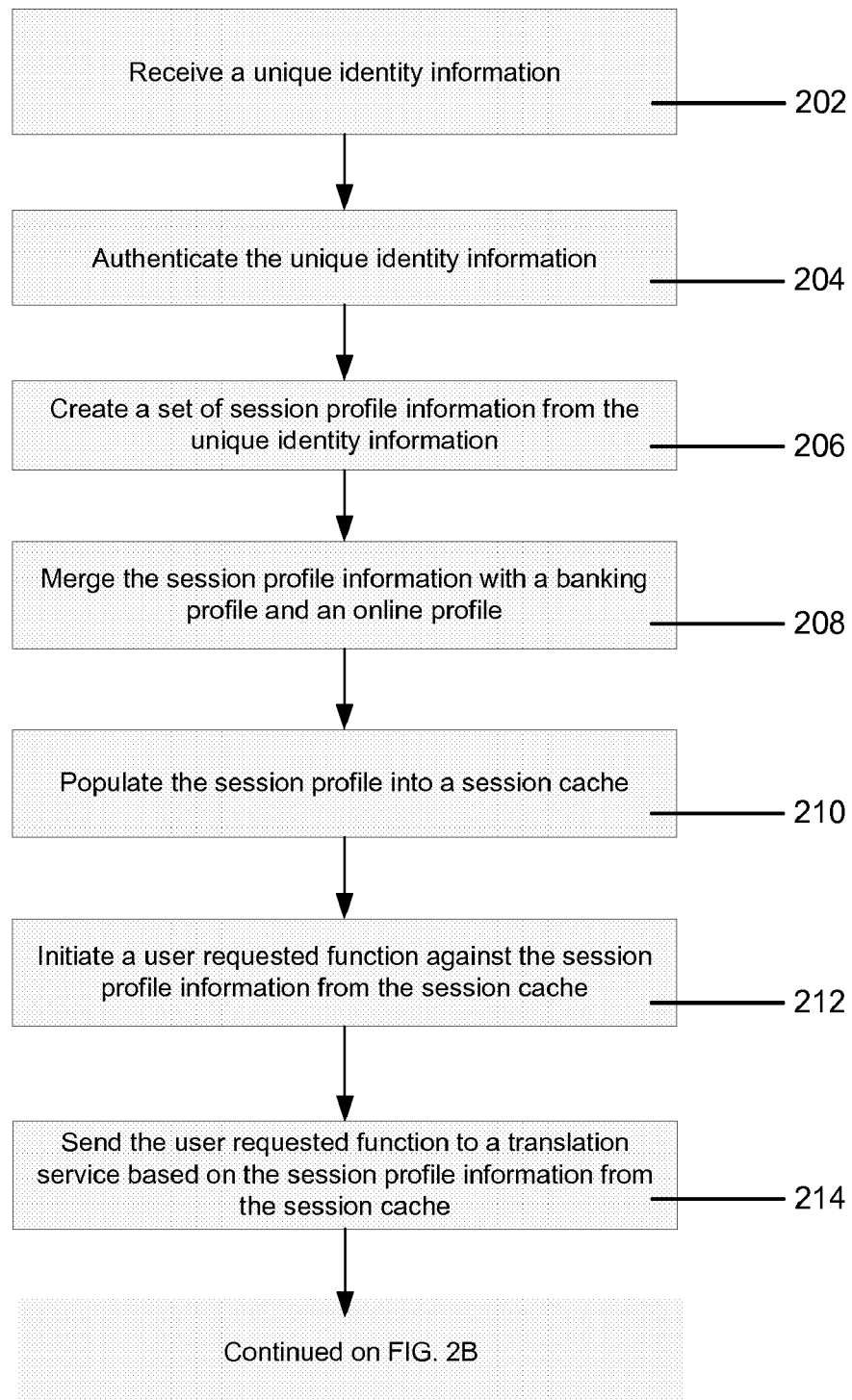
FIGS. 2A and 2B illustrate a flowchart depicting a method according to one or more illustrative aspects of the present invention.
Figure 2B:
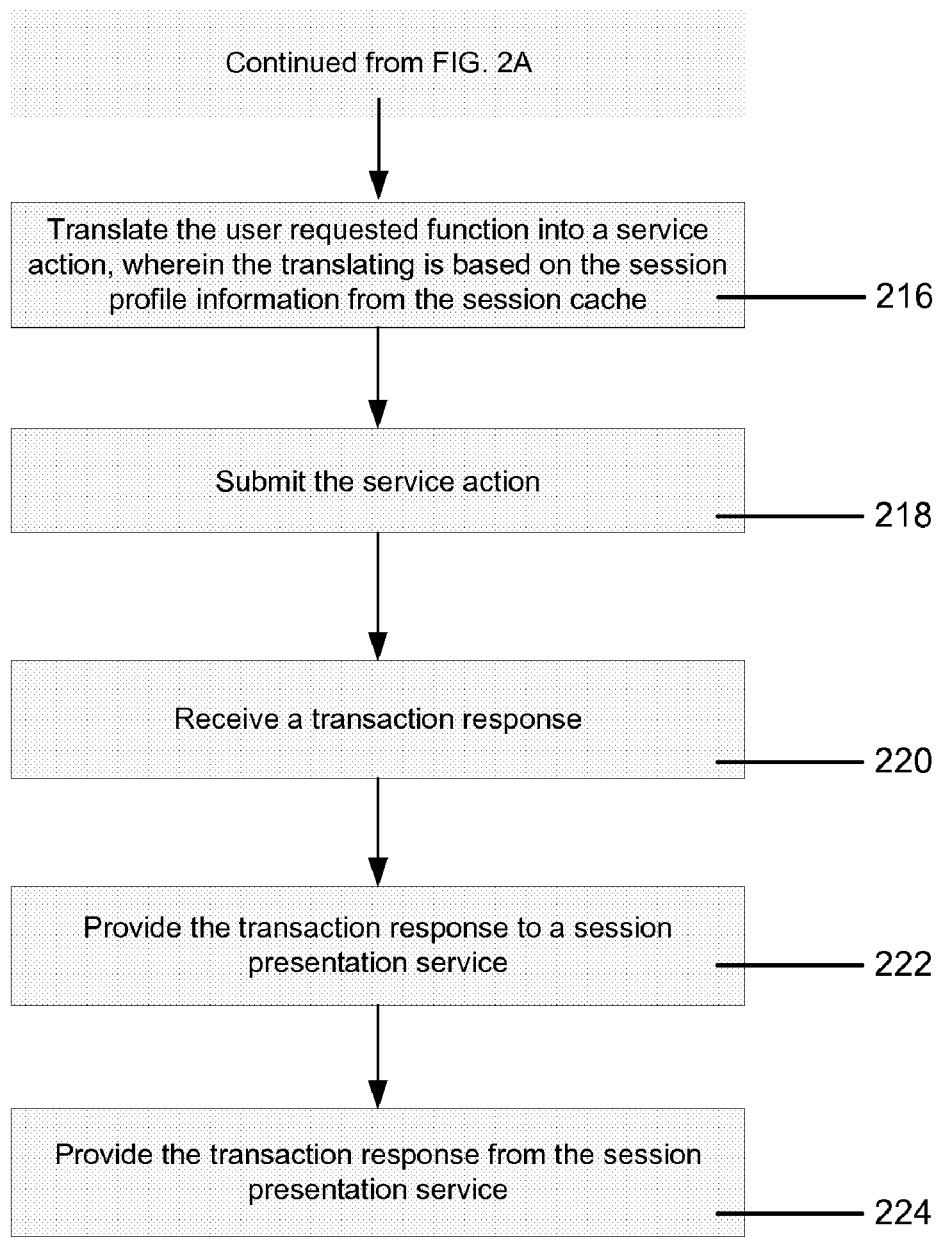

FIGS. 2A and 2B illustrate a flow chart with an embodiment of a process for an electronic financial transaction using this translation system.

At step 202, the user initiates the session or transaction by providing a unique identifier. The user may initiate the banking session from any number of devices, such as an ATM, a web-based system/computer, a branch terminal, the internet, a cell phone, or a PDA. At step 204, a graphic user interface (GUI) may authenticate the unique identifier. This authentication may be performed via a username and password. At step 206, session profile information may then be initiated by the user and created from the unique identifier.

At step 208, the session profile information from step 206 may be merged with a banking profile and an online profile. The session profile information may include the accounts, functions and parameters that are relevant to the user. The banking profile may include the bank's products and their attributes (e.g., rate, terms, available functions, IFW translation, content, promotion, roles, interfaces, identities). The online profile, or ecommerce profile, may include identity (e.g., one or more locations, because the user could be banking in multiple areas and thus through multiple bank back offices), access, user preferences (e.g., language, browser, cookie settings, dashboard settings, connection speed), devices (e.g., mobile via the web, cell phone, smartphone, or SMS; online via Web 2.0, Web 1.0, or ADA; ATM; or kiosk), behavior, functions, and parameters.

At step 210, the session profile information may be populated to a session cache. Following the session profile information being populated, at step 212, the user may initiate an action or function as governed by a session profile filter from the session cache as presented by a session presentation service. The session presentation service may include a mobile presentation layer, an online presentation layer, or an ATM presentation layer, depending on the user's preference or current session. The function may include a transaction from a deposit account, a loan or a credit card or any combination thereof. The functions may further be separated into critical functions, desired functions, or dream functions. This function may be generated in XML from the GUI. The XML command may be for example, "XFER: A, B: Value", which means transfer from account A to account B a certain "Value" of money. Any other type of command similar to XML may be accepted and then convertible in the translation. The function may be initiated against a user accessible account governed by parameters contained in the session cache.

At step 214, the user requested function from step 212 is sent to a translation service based on the session profile information from the session cache from step 210. At step 216, the translation service translates the user requested function into a financial transaction. The translation service may select a translation based on the session cache parameters and bank parameters. The translation service then further assembles one or more financial transactions together.

This translation may be a state-based system that is done concurrently with other operations. The state-based translation may allow for the ability to conduct transactions that guarantee service delivery when the user's bank back office system is unavailable. The transactions may be queued up until the user's bank back office system becomes available. In this instance, the user will be told that their transaction has been posted (but not yet cleared). The user may have the option to be notified once the posting actually occurs (e.g., by an email, sms, etc.).

At step 218, the translation service may submit one or more financial transactions to the applicable back office banking system. The back office banking system performs the function and sends a response back to the translation service. At step 220, the translation service receives and aggregates one or more transaction responses sent from the back office banking system.

At step 222, following receipt of the transaction response from step 220, the translation service provides the aggregate transaction response to the session presentation service. At step 224, the session presentation service may then provide a corresponding transaction response to the user.

Modular Embodiment

A financial transaction system may be depicted and designed using a number of program modules. Generally, program modules include routines, programs, objects, components, data structures, etc. that perform particular tasks or implement particular abstract data types when executed by a processor in a computer or other device.

Figure 3:
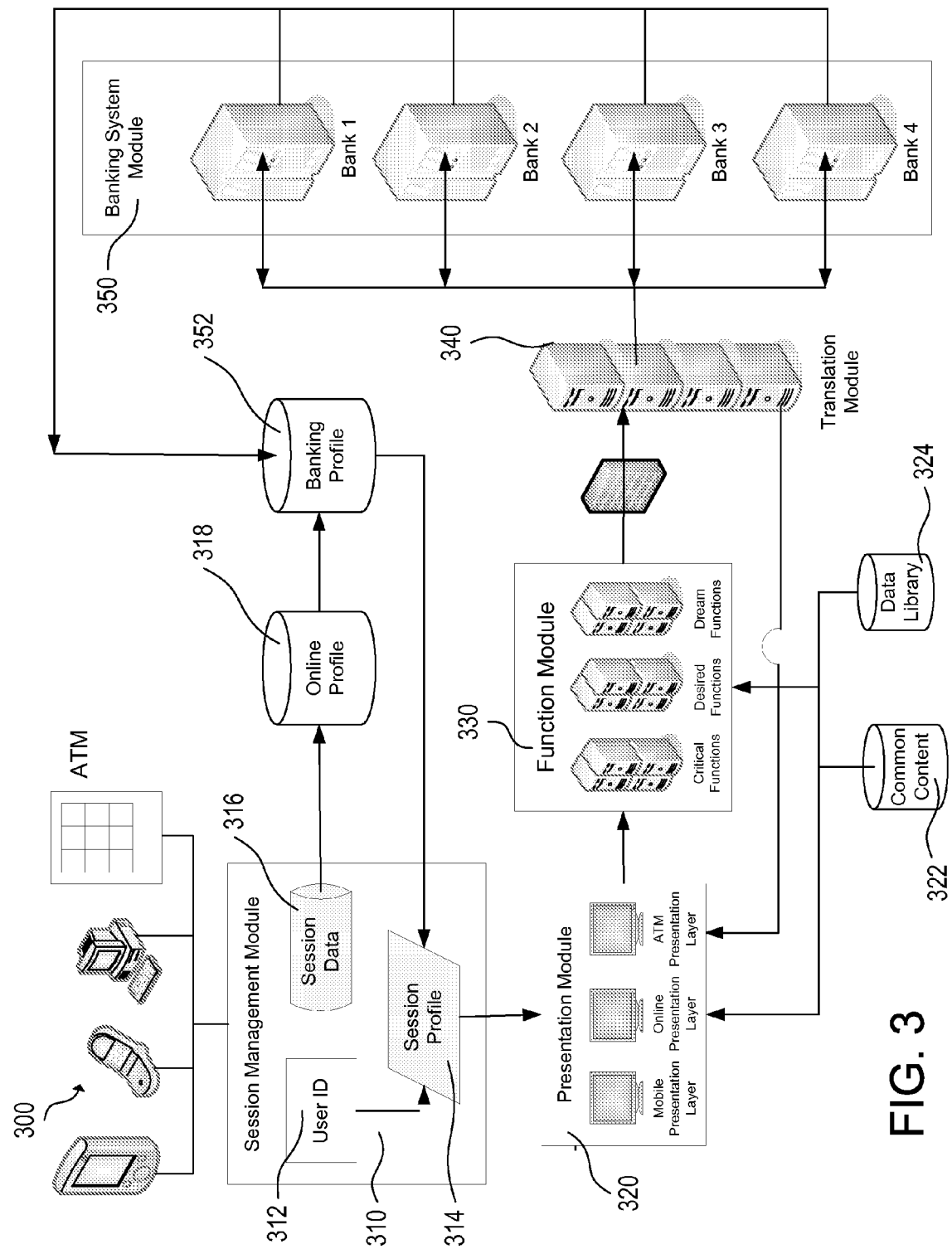
FIG. 3 illustrates a system architecture that may be used with one or more illustrative aspects of the present invention.

As depicted in FIG. 3, the financial transaction system may comprise a number of modules which may include, but is not limited to, the following: a session management module 310, a presentation module 320, a function module 330, a translation module 340, and a banking system module 350. Each of these modules will be described in more detail in the below sections.

Session Management Module

The session management module 310 is operable to receiving a unique identifier from a user. The user may initiate the session from any number of devices, such as an ATM, a web-based computer system, the internet, a cell phone, or a PDA 300. The user may initiate the session by inputting a user ID 312. A set of session profile information 314 may then be initiated from the user and created from the user ID information 312.

Next, the session management module 310 may be operable to merge the session profile information 314 with a banking profile 352 and an online profile 318. The session profile information 314 may include the accounts, functions and parameters that are relevant to the user. The banking profile 352 may include the bank's products and their attributes (e.g., rate, terms, available functions, IFW translation, content, promotion, roles, interfaces, identities). The online profile 318, or ecommerce profile, may include identity (e.g., on or more locations, because the user could be banking in multiple areas and thus through multiple bank back offices), access, user preferences (e.g., language, browser, cookie settings, dashboard settings, connection speed), devices (e.g., mobile via the web, cell phone, smartphone, or SMS; online via Web 2.0, Web 1.0, or ADA; ATM; or kiosk), behavior, functions, and parameters.

Next, the session management module 310 may be operable to populate the session profile information 314 into a session cache. Following the session profile information being populated, the session management module 310 may transmit the session cache to the presentation module 320.

Presentation Module

The presentation module 320 may be operable to receive the session cache from the session management module 310. The presentation module 320 may include a mobile presentation layer, an online presentation layer, or an ATM presentation layer, depending on the user's preference or current session.

The presentation module 320 may also be operable to receive a user requested function through one of the presentation layers. The user requested function may include a transaction from a deposit account, a loan or a credit card or any combination thereof. This function may be generated in XML from the GUI. The XML command may be for example, "XFER: A, B: Value", which means transfer from account A to account B a certain "Value" of money. Any other type of command similar to XML may be accepted and then convertible in the translation.

The presentation module 320 may be operable to then transmit the session profile 314 from the session cache and the user requested function to the function module 330.

The presentation module 320 may also be operable to receive a final service response from the translation module 340 and banking system module 350. The presentation module 320 may then transmit the service response to the end user in order to communicate the final verification of the financial transaction or function as requested by the user.

Function Module

The function module 330 may be operable to initiate and complete the user requested function against the session profile 314 and transmit the user requested function to the translation module based on the session profile 314 from the session cache. The user requested functions may include deposits, withdrawals, transfers, or payments. The functions within the function module 330 may be further separated into critical functions, desired functions, or dream functions. These functions may include "Get Account Balance," "Transfer Funds," "Updated Customer Preferences," etc.

Additionally, a common content database 322 and a data library database 324 may be utilized to further populate and provide information to the presentation module 320 and function module 330. The content database contains product and service offering information and their related conditions (which provide constraints around the previously mentioned functions). It may also contain metadata relating to market segmentation and a myriad of other methods of targeting specific products and services toward a particular customer or customer set. The content library or repository is the location of actual rendered content and its associated metadata descriptors.

Translation Module

The translation module 340 is operable to receive the financial transaction from the function module 330. Further, the translation module 340 is operable to translate the user requested function into a financial transaction. The translation module may select a translation based on the session cache parameters and further assembles one or more financial transactions. This translation may be a state-based system that is done concurrently with other operations. The state-based translation may allow for conducting transactions that guarantee service delivery when the user's bank back office system is unavailable. The transactions may be queued up until the user's bank back office system becomes available. The user will be told that their transaction has been posted (but not yet cleared), and the user may have the option can be notified once the posting actually occurs (e.g., by an email, sms, etc.).

The translation module 340 may submit one or more financial transactions to the banking system module 350. Additionally, the translation module 340 may be operable to receive the service response from the banking system module 350 and transmit this service response to the presentation module 320 for final delivery to the user.

Banking System Module

The banking system module 350 may be operable to receive the financial transaction from the translation module 340. The banking system module 350 may include a number of different back office banking systems which have the ability to perform the financial transactions and send a transaction response back to the translation module 340. The banking system module 350, such as Bank 1, Bank 2, Bank 3, and Bank 4, may represent one or more different regional banks, or one or more newly acquired banks.

The banking system module 350 may also be operable to generate the transaction response from the financial transaction and then transmit this transaction response back to the translation service 340.

With the prior art and the current architecture for financial transaction systems, there are many shortcomings. First, each bank back office has its own focused view of the ecommerce profile. Second, the presentation layers must understand multiple back-end systems. Third, the developers of the presentation layers must maintain individualized bank rules via separate source code. Fourth, there are increased processing costs from inefficient rules processing. Fifth, because each of the products are in each bank back office, there is increased complexity. And last, the tight coupling of the layers, products and mainframe systems creates longer release cycles.

The consequences of these shortcomings can be recognized when new bank back office are added or changed, which causes low-speed to market time, a high cost of change, longer project schedules, increased Failed Customer Interactions (FCIs), and reduced Total Cost of Ownership (TCO).

There are additional features or aspects of this invention which overcome these shortcomings. The process provides a consistent view and application of the ecommerce profile with the Session Failover which may provide a back-up when there is a bank back office failure. Additionally, the presentation layer is separated from both code and content. There are common content and data libraries. The simple federation of functions allows for shorter iteration cycles. The translation layer decouples the ecommerce from the large integrated releases with the bank back office. Additionally, as new bank back office entities are added, new translations can be easily added to accommodate these new entities. These solutions equate to faster speed to market, lower cost of change, 2-6 month projects, reduced FCIs, and reduced TCO.

While illustrative embodiments described herein embody various aspects are shown, it will be understood by those skilled in the art that the invention is not limited to these embodiments. Modifications may be made by those skilled in the art, particularly in light of the foregoing teachings. For example each of the elements of the aforementioned embodiments may be utilized alone or in combination or sub-combinations with the elements of the other embodiments. It will also be appreciated and understood that modification may be made without departing from the true spirit and scope of the present intention. The description is thus to be regarded as illustrative instead of restrictive on the present intention.

What is claimed is:

1. A method for processing a financial transaction comprising:
   receiving a unique identifier at a server, wherein the server authenticates the unique identifier;
   creating a set of session profile information from the unique identifier;
   merging the session profile information with a banking profile and an online profile;
   populating the session profile information into a session cache;
   initiating a first user requested function against the session profile information from the session cache;
   translating the first user requested function into a first financial transaction for a first bank system, wherein the translation is based on the session profile information from the session cache, and further wherein the session profile information is decoupled from the first bank system;
   submitting the first financial transaction to the first bank system;
   initiating a second user requested function against the session profile information from the session cache;
   translating the second user requested function into a second financial transaction for a second bank system, wherein the translation is based on the session profile information from the session cache, and further wherein the session profile information is decoupled from the second bank system; and
   submitting the second financial transaction to the second bank system.

2. The method of claim 1, wherein the method further comprises the step of receiving a transaction response from the first bank system or the second bank system.

3. The method of claim 2, wherein the method further comprises the steps of:
   providing the transaction response to a session presentation service; and
   providing the transaction response from the session presentation service to a user.

4. The method of claim 1, wherein the session profile information is selected from the group consisting of: user accounts, user functions, and user parameters.

5. The method of claim 4, wherein the user accounts are selected from the group consisting of: deposit accounts, loan accounts, credit card accounts, investment accounts, and insurance accounts.

6. The method of claim 4, wherein the user functions are selected from the group consisting of: deposits, withdrawals, transfers, and payments.

7. The method of claim 1, wherein the translation is based on XML commands.

8. The method of claim 1, wherein the banking profile comprises information from at least one banking system.

9. An apparatus comprising:
   a display;
   a memory;
   a processor coupled to the memory and programmed with computer-executable instructions for performing steps comprising:
   receiving a unique identifier;
   authenticating the unique identifier;
   creating a set of session profile information from the unique identifier;
   merging the session profile information with a banking profile and an online profile;
   populating the session profile information into a session cache;
   initiating a first user requested function against the session profile information from the session cache;
   sending the first user requested function to a translation module based on the session profile information from the session cache;
   translating the first user requested function into a first financial transaction for a first banking system, wherein the translation is based on the session profile information from the session cache, and the translation comprises XML commands, and further wherein the session profile information is decoupled from the first banking system;
   submitting the first financial transaction to the first banking system;
   initiating a second user requested function against the session profile information from the session cache;
   sending the second user requested function to the translation module based on the session profile information from the session cache;
   translating the second user requested function into a second financial transaction for a second banking system, wherein the translation is based on the session profile information from the session cache, and the translation comprises XML commands, and further wherein the session profile information is decoupled from the second banking system; and
   submitting the second financial transaction to the second banking system.

10. The method of claim 9, wherein the processor further performs the steps of:
    receiving a transaction response from the first bank system or the second bank system;

providing the transaction response to a session presentation service; and providing the transaction response from the session presentation service to a user.

11. The method of claim 9, wherein the session profile information is selected from the group consisting of: user accounts, user functions, and user parameters.

12. The method of claim 11, wherein the user accounts are selected from the group consisting of: deposit accounts, loan accounts, credit card accounts, investment accounts, and insurance accounts.

13. The method of claim 11, wherein the user functions are selected from the group consisting of: deposits, withdrawals, transfers, and payments.

14. The method of claim 9, wherein the banking profile comprises information from at least one banking system.

15. A financial transaction system comprising:

a processor configured according to computer executable instructions stored in a memory, said computer executable instructions defining:

a session management module operable to receive a unique identifier, authenticate the unique identifier, create a session profile from the unique identifier, merge the session profile with a banking profile and an online profile, populate the session profile into a session cache, and transmit the session cache to a presentation module;

the presentation module operable to receive the session cache from the session management module, receive a first user requested function, and transmit the session profile from the session cache and the first user requested function;

a function module operable to initiate the first user requested function against the session profile, complete the first user requested function, and transmit the first user requested function to a translation module based on the session profile from the session cache;

the translation module operable to translate the first user requested function into a first financial transaction for a first banking system and submit the first financial transaction to a first banking system module, wherein the translation is based on the session profile from the session cache, and further wherein the session profile is decoupled from the first banking system;

the first banking system module operable to receive the first financial transaction from the translation module, generate a first transaction response from the first financial transaction, and transmit the first transaction response to the translation module;

the translation module further operable to receive the first transaction response from the first banking system module, and provide the first transaction response to the presentation module;

the presentation module further operable to provide the first transaction response to the user;

the presentation module further operable to receive a second user requested function, and transmit the session profile from the session cache and the second user requested function;

the function module further operable to initiate the second user requested function against the session profile, complete the second user requested function, and transmit the second user requested function to the translation module based on the session profile from the session cache;

the translation module further operable to translate the second user requested function into a second financial transaction for a second banking system and submit the second financial transaction to a second banking system module, wherein the translation is based on the session profile from the session cache, and further wherein the session profile is decoupled from the second banking system;

the second banking system module operable to receive the second financial transaction from the translation module, generate a second transaction response from the second financial transaction, and transmit the second transaction response to the translation module;

the translation module further operable to receive the second transaction response from the second banking system module, and provide the second transaction response to the presentation module;

the presentation module further operable to provide the second transaction response to the user.

16. The financial transaction system of claim 15, wherein the presentation module receives information from a common content database.

17. The financial transaction system of claim 15, wherein the function module receives information from a common content database.

18. The financial transaction system of claim 15, wherein the presentation module receives information from a data library database.

19. The financial transaction system of claim 15, wherein the function module receives information from a data library database.

20. The financial transaction system of claim 15, wherein the translation is based on XML commands.

* * * * *